UNITED STATES PATENT OFFICE 2,647,137

TRIORGANOSILYLBENZAMIDES

Kurt C. Frisch and Phiroze D. Shroff, Pittsfield, Mass., assignors to General Electric Company, a corporation of New York No Drawing. Application July 24, 1952, Serial No. 300,763

5 Claims. (Cl. 260—448.2)

This invention is concerned with novel organosilicon compositions. More particularly, the invention relates to triorganosilylbenzamides of the general formula

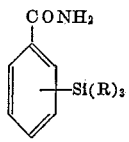

where R is the same or different monovalent hydrocarbon radicals. The compositions herein described can be used as chemical intermediates and can be employed in the manufacture of silicone rubbers, resins, fibers, etc. The presence of the amide polar group in the derivatives described above should promote greater interchain attraction and, hence, greater strength properties in compositions which may be deficient in such properties.

Among the values for which R may stand are, for instance, alkyl radicals (e. g., methyl, ethyl, propyl, isopropyl, butyl, decyl, etc.), aryl radicals (e. g., phenyl, naphthyl, biphenyl, etc.), aralkyl radicals (e. g., benzyl, phenylethyl, etc.), alkaryl radicals (e. g., tolyl, xylyl, ethylphenyl, etc.), cycloaliphatic radicals (e. g., cyclohexyl, cyclopentyl, cyclohexenyl, etc.), as well as monovalent hydrocarbon radicals containing substituents thereon which are inert, for instance, halogen, such as chlorine, bromine, fluorine, etc.

The compounds herein disclosed and claimed may advantageously be prepared by effecting reaction between a triorganosilylbenzoic acid of the formula

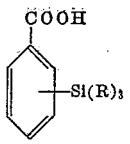

and thionyl chloride in the presence of hydrohalide acceptor, e. g., pyridine, etc., where R has the meaning given above. By such a reaction there will be obtained the triorganobenzoyl chloride of the formula

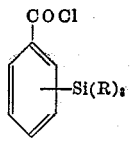

The latter compound can be treated with, for instance, concentrated ammonium hydroxide to give the triorganosilylbenzamide described above.

In order that those skilled in the art may better understand how the present invention may be practiced, the following examples are given by way of illustration and not by way of limitation. All parts are by weight.

The p-trimethylsilylbenzoic acid employed in the following examples and used as the starting material was prepared in accordance with the directions described by Roberts, McElhill and Armstrong, in J. A. C. S. 71, 2925 (1949) by reacting p-trimethylsilylphenylmagnesium bromide with carbon dioxide in accordance with the following equation:

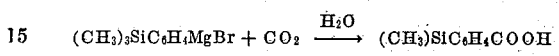

The p-trimethylsilylbenzoic acid prepared had a melting point of 117–118° C.

Example 1

About 11.5 parts p-trimethylsilylbenzoic acid, 6.0 parts diethyl ether, and 4.7 parts pyridine were placed in a reaction vessel. To this mixture was added a solution of 7.1 parts thionyl chloride dissolved in about 80 parts diethyl ether. The thionyl chloride solution was added slowly while at the same time shaking the reaction mass thoroughly. The agitation of the reaction mass was continued for about 10 minutes after all of the thionyl chloride solution had been added. The white precipitate consisting of pyridine hydrochloride was filtered off, and the filtrate (which comprised p-trimethylsilylbenzoyl chloride of the formula $(CH_3)_3SiC_6H_4COCl$) was added gradually to an excess (about 5 to 10 times the volume of the filtrate) of concentrated ammonium hydroxide solution while at the same time the mass was cooled by means of an ice bath. There was thus obtained a white crystalline precipitate. The ether was removed and the residual crystals filtered and washed several times to give p-trimethylsilylbenzamide in the form of colorless platelets having a melting point of about 153° C. Analysis of this compound showed it to contain 14.8% silicon and 6.9% nitrogen (theoretical 14.5% silicon and 7.2% nitrogen). The yield of the product was above 70% based on the weight of the p-trimethyl-benzoic acid used.

Example 2

The compound para-triphenylsilylbenzamide may be prepared in the same way as that described in making para-trimethylsilylbenzamide by employing para-triphenylsilylbenzoic acid in place of the para-trimethylsilylbenzoic acid used in Example 1. The same procedure is used as that described in Example 1 to give the compound para-triphenylsilylbenzamide having the formula

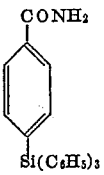

It will, of course, be apparent to those skilled in the art that the triorganosilyl group may be attached to other points of the phenyl nucleus; for instance, instead of being in the para position, it may be in the ortho or meta positions. Moreover, the organic groups positioned around the silicon atom may also be varied widely in accordance with the various values for which R stands. R, of course, may be different organic radicals as, for instance, the monovalent hydrocarbon radicals around the silicon atom may consist of one methyl group and two ethyl groups, or one methyl group and two phenyl groups, etc. We do not intend to be limited to the type of organic groups around the silicon atom nor to the position on the benzene nucleus to which the silicon atom is attached.

In addition to the uses described above for the compositions herein disclosed and claimed, the triorganosilylbenzamides can also be condensed with aldehydes or can be used as a modifying agent in the preparation of phenolformaldehyde resinous compositions to impart plasticity to resinous compositions prepared from such mixtures. It should be pointed out that it is possible to prepare other derivatives of the compounds herein described, wherein R in addition to being a monovalent hydrocarbon radical may also be a halogen. Thus, compounds of the type

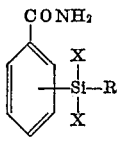

where R has the meaning given above and X is a halogen may also be employed and comprise novel compositions useful in the art. Such types of compositions may be hydrolyzed to give polymeric materials having the recurring structural unit

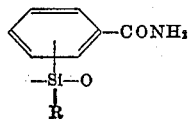

where $n$ is an integer equal to at least 1. Such materials may be useful in making silicon oils, rubbers, and resins.

What we claim as new and desire to secure by Letters Patent of the United States is:

1. A composition of matter comprising a compound having the general formula

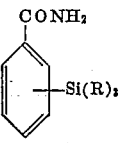

where R is a monovalent hydrocarbon radical selected from the class consisting of alkyl, aryl, aralkyl, alkaryl, and cycloaliphatic radicals.

2. The chemical compound para-trimethylsilylbenzamide.

3. The chemical compound para-triphenylsilylbenzamide.

4. The process for making a composition of matter having the general formula

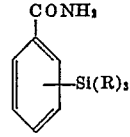

which comprises effecting reaction between a compound having the general formula

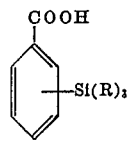

and thionyl chloride in the presence of an excess of pyridine to obtain a compound having the general formula

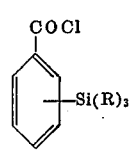

and thereafter treating the latter compound with ammonium hydroxide to obtain the desired composition, where R in the aforementioned formulae is a monovalent hydrocarbon radical selected from the class consisting of alkyl, aryl, aralkyl, alkaryl, and cycloaliphatic radicals.

5. The process which comprises (1) effecting reaction between a compound having the formula

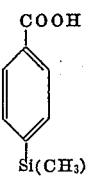

and thionyl chloride in the presence of pyridine to obtain the compound

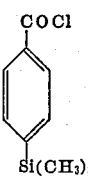

and (2) thereafter reacting the latter compound with ammonium hydroxide to give para-trimethylsilylbenzamide.

KURT C. FRISCH.
PHIROZE D. SHROFF.

References Cited in the file of this patent

UNITED STATES PATENTS

| Number | Name | Date |
|---|---|---|
| 2,610,198 | Sommer | Sept. 9, 1952 |

OTHER REFERENCES

Roberts et al., "Jour. Am. Chem. Soc.," vol. 71 (1949), pages 2923–6.